United States Patent [19]
Fogelberg

[11] 3,830,359
[45] Aug. 20, 1974

[54] METHOD AND APPARATUS FOR DIVIDING ARTICLES

[75] Inventor: Clement V. Fogelberg, Arvada, Colo.

[73] Assignee: Columbine Glass Company, Inc., Wheat Ridge, Colo.

[22] Filed: Aug. 8, 1973

[21] Appl. No.: 386,670

[52] U.S. Cl. .............................. 198/30, 198/31 AC
[51] Int. Cl. ........................................... B65g 47/26
[58] Field of Search............. 198/31 AC, 31 AB, 30; 221/310

[56] References Cited
UNITED STATES PATENTS
| | | | |
|---|---|---|---|
| 1,747,465 | 2/1930 | Cameron | 198/31 AC |
| 2,736,417 | 2/1956 | Greer | 198/31 AC |

*Primary Examiner*—Richard A. Schacher
*Assistant Examiner*—Hadd S. Lane
*Attorney, Agent, or Firm*—Thomas W. O'Rourke

[57] ABSTRACT

A method and apparatus for dividing articles, such as containers, randomly supported on a conveyor belt into two distinct columns by intercepting the articles between two elongated arms extending from opposite sides of the conveyor belt and converging along the direction of travel of the conveyor belt until the ends of the arms are narrowly spaced apart a distance about the width of the articles, positioning the arms in one of two positions corresponding to the desired column with the more closely spaced ends thereof apart a distance sufficient to permit the articles to pass therebetween, and, while switching the arms to the other position, biasing the arms to converge slightly thereby precluding passage of articles therebetween while the arms are in the transitional mode.

6 Claims, 8 Drawing Figures

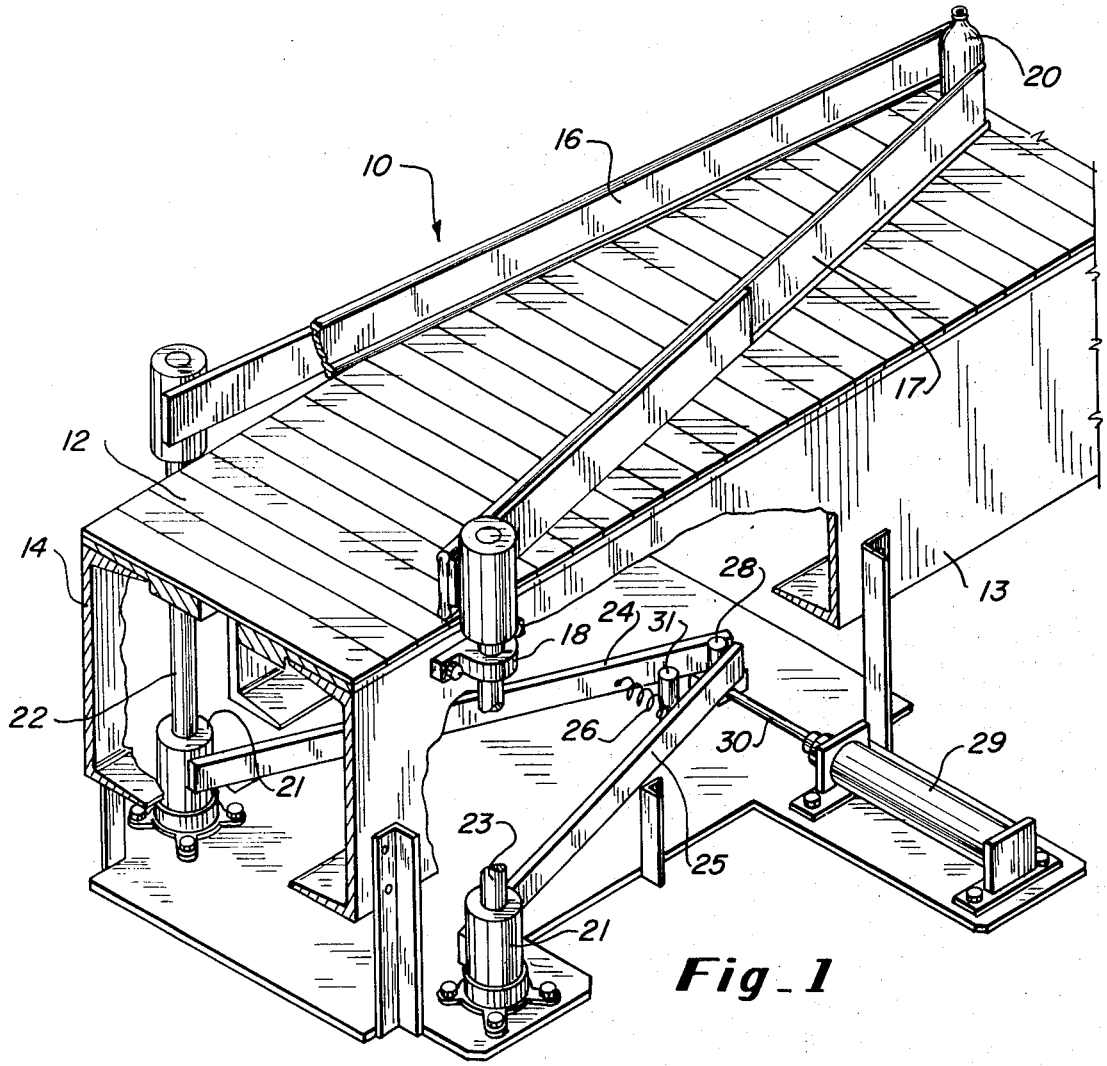
Fig_1
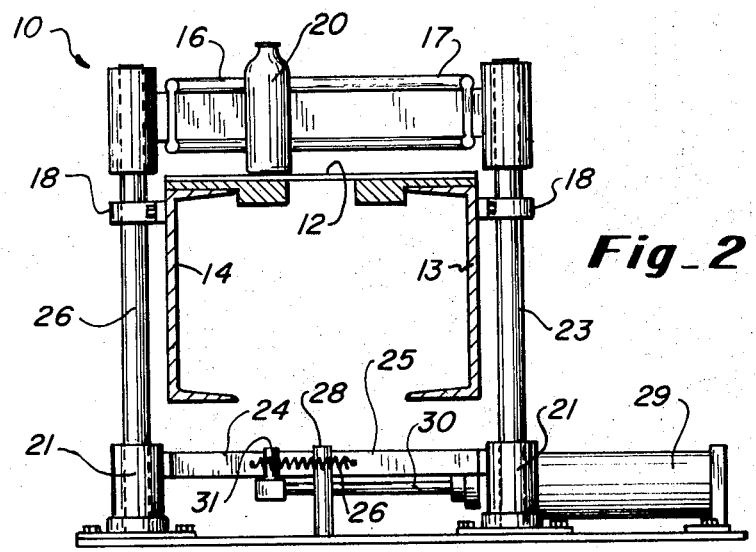
Fig_2

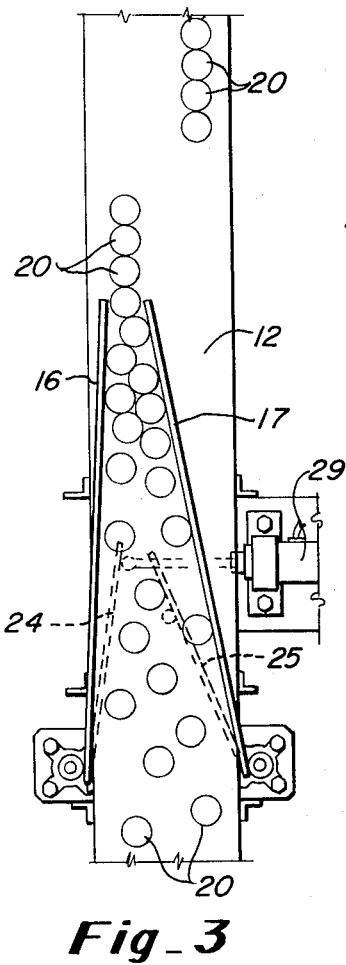
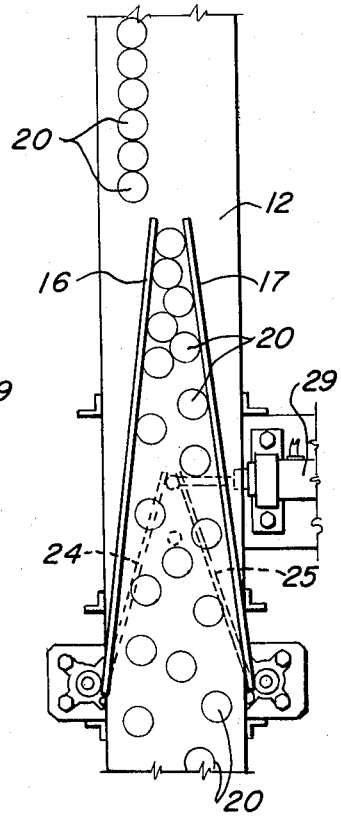
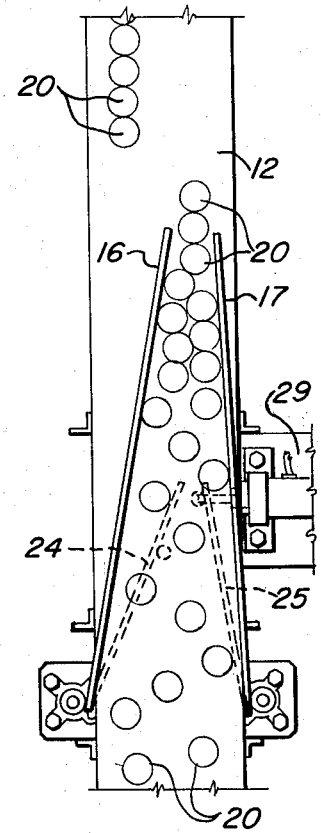
Fig_3     Fig_4     Fig_5
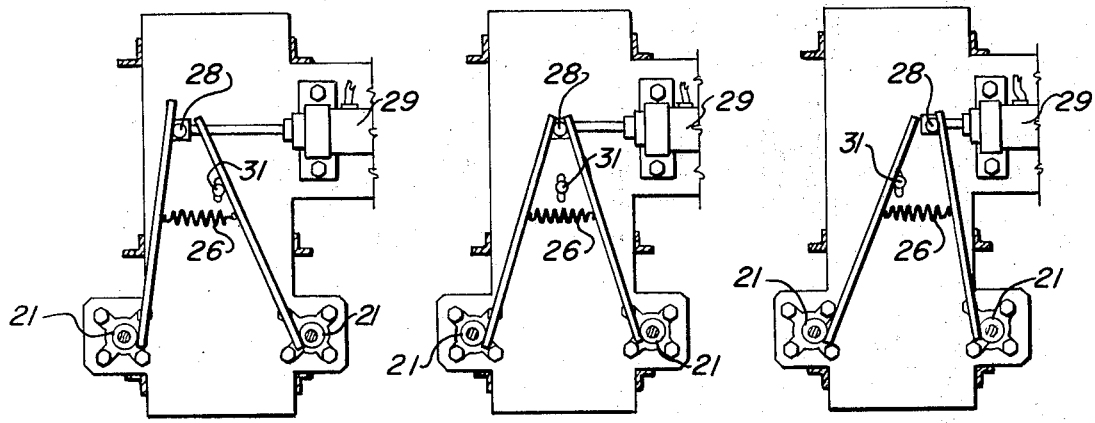
Fig_6     Fig_7     Fig_8

METHOD AND APPARATUS FOR DIVIDING ARTICLES

Background of the Invention

1. Field of the Invention

The present invention relates generally to article handling and more particularly to a simple and advantageous device for arranging regularly-shaped articles randomly spaced on a conveyor belt into two distinct columns of articles while precluding passage of articles in other than in one of the other of the columns.

2. Description of the Prior Art

Articles, such as containers, are produced by high-speed, mass-production machinery. Because of the high rate of production, it is necessary to treat, test, inspect, etc., the articles in a highly automated fashion. Particularly in the case of production of glassware for containment of foods or beverages, it is necessary to carefully inspect each item of glassware for imperfections, either functional or structural, as well as to inspect for inclusion of foreign matter within the article. As a result of extremely high production rates and accompanying line speeds, such inspection, though highly automated, is often carried out by a plurality of identical inspection machines operating in parallel. Accordingly, it is necessary to split or divide the articles progressing down the line into two columns, with, of course, the option of further subdividing into more such columns, in order to provide and orient a substantially equal portion of the supply to each parallel inspection apparatus or other operation.

Heretofore, line dividers have been relatively smal-langle stationary protrusions disposed to intercept articles and direct articles to one or the other side of the protrusion. Basically, this approach placed a "boat prow" in the center of the conveyor to divide the glassware or other articles. Unfortunately, with the great number of articles impacting upon such a line divider, it has been found that a significant number impact directly upon the point of the divider and, being in unsteady equilibrium relative to the protrusion, are subject to upset. Further, if the articles are not equally supplied on both sides of the conveyor, the division of the articles will not be equal. Accordingly, there is a recognized need for a more stable and positive line divider which is not subject to the possible varying unsymmetric arrangement of articles across the conveyor belt, which tends to support rather than upset articles and which functions in a simple, trouble-free manner.

SUMMARY OF THE INVENTION

The present invention, which provides a heretofore unavailable means of dividing randomly spaced and arranged regularly-shaped articles on a conveyor into two spaced apart and well-defined columns on the conveyor. More specifically, the present invention provides a method and apparatus whereby such articles are intercepted between two converging elongated arms which are spaced apart sufficiently to allow passage of the articles therebetween only when the arms are positioned in one of two positions corresponding to the desired columns, and in which the arms are biased to converge and preclude passage of articles therebetween when transitionally between such positions.

Accordingly, an object of the present invention is to provide a new and improved apparatus and method for positively dividing articles moving on a conveyor belt into two or more distinct columns.

Another object of the present invention is to provide an apparatus and method for stabilizing articles while dividing the articles into two or more distinct columns upon the conveyor belt.

Yet another object of the present invention is to provide a new and improved method and apparatus for dividing articles carried upon a conveyor belt into substantially equal columns without regard for the transverse spacing or arrangement of such articles on the conveyor belt.

These and other objects of the invention will become apparent from the following description.

BRIEF DESCRIPTION OF THE DRAWINGS

In the drawings:

FIG. 1 is a perspective view of an apparatus according to the instant invention;

FIG. 2 is an end view of the apparatus according to the instant invention shown in FIG. 1;

FIGS. 3 through 5 are top views along the plane of line 4—4 of the apparatus of the instant invention; and FIGS. 6 through 8 are partial sectioned top views along the plane of line 3—3 of the apparatus of the instant invention.

DETAILED DESCRIPTION OF THE INVENTION

Turning now to the drawings, wherein like components are designated by like reference numerals throughout the various figures, a device for dividing articles carried on a conveyor belt is illustrated in FIG. 1 and generally designated by the reference numeral 10. As shown, a conveyor belt 12 is disposed and carried on frames 13 and 14. Arms 16 and 17 are supported on either side of conveyor 12 by bearings 18. Articles carried on conveyor belt 12, such as bottles 20, are intercepted between converging arms 16 and 17. The position of arms 16 and 17 are determined by shafts 22 and 23 which, in turn, are connected to positioning arms 24 and 25, respectively. In addition to bearings 18, shafts 22 and 23 are journaled into lower supports 21. Positioning members 24 and 25 are biased towards one another by spring 26 and, as a result of such biasing, positively include therebetween projection 28. Projection 28 is attached to piston and cylinder means 29 through arm 30.

Accordingly, when the piston and cylinder means 29, which may be pnuematic or hydraulic, is activated, projection 28 moves arms 24 and 25 to one of two extreme positions corresponding with the travel of piston and cylinder means 29. However, a stop 31 engages, for instance, positioning member 24 when projection 28 is moved to the more remote position from piston and cylinder means 29. When stop 31 engages positioning member 24, projection 28 continues to bear upon positioning member 25 and, accordingly, distends spring 26. This results in arm 17 terminating movement before arm 16 does. The continued movement of arm 16 increases the spacing between arms 16 and 17, thereby permitting bottles 20 to pass therebetween. However, when piston and cylinder means 29 is shifting positions, spring 26 biases arms 16 and 17 into a spacing which will not permit passage of bottles 20. Of course, when piston and cylinder means 29 is moved into a position with projection 28 in the position closest to piston and cylinder means 29, stop 31 engages positioning member 25 while positioning member 24 continues to move with projection 28, thereby again distending spring 26 and providing another location at which bottles 20 can pass between arms 16 and 17.

The operation of the apparatus of the instant invention will be more readily understood with reference to FIGS. 3 through 8. FIG. 3 illustrates arms 16 and 17 in a column-forming mode, i.e., with the space therebetween sufficient to permit bottles 20 to pass in a column. As shown in FIG. 6, which corresponds to FIG. 3, positioning member 25 is precluded by stop 31 from moving further at the urging of piston and cylinder means 29. However, projection 28 bears against positioning member 24 and, by distending spring 26, continues to move positioning member 24 after positioning member 25 is against stop 31. Accordingly, as shown in FIG. 3, arms 16 and 17 are spaced sufficiently to permit columns of bottles 20 to pass therebetween.

As arms 16 and 17 shift to another position, as shown in FIG. 4, positioning members 24 and 25 are urged together towards projection 28 by spring 26, as shown in FIG. 7, thereby reducing the distance between arms 16 and 17, as shown in FIG. 4, and precluding passage of bottles 20 therebetween while arms 16 and 17 are being shifted to another position by movement of piston and cylinder means 29.

When arms 16 and 17 reach another position whereat it is desired to again form another column of bottles 20, as shown in FIG. 5, positioning member 24 is precluded from movement by stop 31 while positioning member 25 is urged to further movement by projection 28, thereby again distending spring 26 and, in turn, widening the distance between arms 16 and 17, as shown in FIG. 5, and permitting bottles 20 to pass therebetween in a second column distinct from and accurately spaced from the first column formed, as shown in FIG. 3.

Operation of piston and cylinder means 29, or other movement means, can be by a simple, timed switch arrangement (not shown) which, when varied, modulates the time during which arms 16 and 17 are maintained in a given column-forming position and, accordingly, determines the lengths of the columns of bottles 20 form. By switching more frequently, shorter columns of bottles 20 can be formed.

From the above description, it is apparent that arms 16 and 17 positively intercept all bottles 20 on conveyor 12, without reference to the positioning of bottles 20 on conveyor 12. Further, arms 16 and 17 positively support bottles 20 therebetween and essentially preclude toppling of bottles 20. As a result of the diminished spacing between arms 16 and 17 while switching between column-forming positions, bottles 20 are permitted to pass only when arms 16 and 17 are in such column-forming positions. Accordingly, the embodiment illustrated, though quite simple in construction, accomplishes all of the objectives of the instant invention.

It is to be understood, of course, that means other than the piston and cylinder means are suitable for movement of the arms. Numerous mechanical equivalents of the specific embodiment illustrated and discussed will be readily apparent to those skilled in the art, given the concept of the apparatus and method of the instant invention. Accordingly, although only one embodiment of the instant invention has been illustrated and described, it is clear that various changes and modifications will be apparent to those skilled in the art and that such changes may be made without departing from the scope of the invention, as defined by the following claims.

What is claimed is:

1. Apparatus for dividing articles supported on a conveyor, comprising: two elongated movable arms extending in the direction of travel of the conveyor from each side of the conveyor in converging relationship with the more adjacent ends of the arms being nominally spaced apart a distance sufficient to permit passage of articles therebetween, means for moving the arms in unison between positions in which it is desired to permit passage of the articles, and means to decrease the spacing between the ends of the arms to a distance insufficient to permit passage of articles therebetween while the arms are being moved between the positions, whereby the articles are formed into columns at the positions whereat passage is desired and precluded from passage between the arms until the arms are at such positions.

2. Apparatus for forming divided columns of randomly spaced glassware articles carried on a conveyor belt, comprising: two movably supported arms extending in a plane parallel to that of the conveyor belt from each side of the conveyor belt in a conveying relationship in the direction of travel of the conveyor, means for biasing the more adjacent ends of the arms into a spaced-apart relationship with the included space being a distance insufficient to permit passage of the glassware articles therebetween, and means for alternatively locating the arms in one of the two positions corresponding to the desired spacing laterally of the glassware articles on the conveyor belt including means for overcoming the biasing means when the arms are in such positions, whereby the means to overcome the biasing means increases the spacing between the ends of the arms and permits passage of articles therebetween in the desired positions.

3. Apparatus as set forth in claim 2 wherein the biasing means is a spring in tension operably connected between the arms and the means to overcome the biasing means comprise a stop positioned to abut against and terminate movement of the movement means of only one of the arms while the other of the arms is moved further by overcoming the spring tension thereby increasing the spacing between the arms.

4. Apparatus as set forth in claim 3 wherein each of the arms is secured to a rotatable, vertical shaft mounted adjacent the side of the conveyor with each of the shafts having members protruding therefrom vertically spaced from said arms in a plane parallel to the arms, and wherein the stop is positioned between the members to selectively and alternatively abut one of the members, the spring being attached between the members to maintain them in a biased adjacent relationship.

5. Apparatus for forming randomly spaced glassware articles carried and supported on a conveyor belt, comprising: a support, two vertical shafts adjacent each side of the conveyor belt and attached movably to the support, two elongated arms one each of which is attached to each of the vertical shafts and both extending in a converging relationship above and in a plane parallel to the plane of the conveyor belt, a positioning member attached to each of the shafts at a position spaced along the shaft from the arm and extending in a converging relationship similar to that of the arm, a spring connected to each of said members to bias them in an adjacent relationship, a projection included between the members, means for moving the projection transversely of the conveyor belt in an engaging relationship with at least one of the members, a stop member located between the members to engage one of the members upon significant travel of the projection, whereby the projection, when moved to one extreme or the other by the movement means, bears against one of the members while the other is precluded from further movement by the stop thereby causing the spring to extend between the members and, accordingly, rotation of the shaft by each of the members, to cause the arms to be spaced for passage of glassware articles therebetween in selective positions.

6. A method for dividing articles supported on a conveyor, comprising: conveying the articles between two arms converging in the direction of travel of the articles, positioning the arms in a first position in a spaced-apart relationship sufficient to permit passage of the articles between the ends of the arms, conducting the articles between the spaced-apart ends of the arms to form a first column of articles, terminating passage of articles therebetween by initiating movement of the arms to a second position and concurrently decreasing the spacing between the ends of the arms to that insufficient to allow passage of articles therebetween, positioning the arms in a second position and concurrently increasing the spacing between the ends of the arms to that adequate to permit passage of articles therebetween, and conducting articles between the ends of the arms positioned in the second position to form a second column of articles.

* * * * *

UNITED STATES PATENT OFFICE
CERTIFICATE OF CORRECTION

Patent No. 3,830,359          Dated August 20, 1974

Inventor(s) Clement V. Fogelberg

It is certified that error appears in the above-identified patent and that said Letters Patent are hereby corrected as shown below:

Claim 2, line 27, "conveying" should read -- converging --.

Signed and sealed this 26th day of November 1974.

(SEAL)
Attest:

McCOY M. GIBSON JR.          C. MARSHALL DANN
Attesting Officer            Commissioner of Patents